US009607269B2

(12) United States Patent
Daly et al.

(10) Patent No.: US 9,607,269 B2
(45) Date of Patent: Mar. 28, 2017

(54) INTELLIGENT SUBSCRIBER NOTIFICATION BASED ON A CONFIDENCE LEVEL OF VIEWING MESSAGES

(71) Applicant: AT&T INTELLECTUAL PROPERTY I, LP, Atlanta, GA (US)

(72) Inventors: Brian Kevin Daly, Peachtree Corners, GA (US); Charles Peter Musgrove, Henderson, NV (US); DeWayne A. Sennett, Redmond, WA (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

(21) Appl. No.: 15/134,715

(22) Filed: Apr. 21, 2016

(65) Prior Publication Data

US 2016/0232453 A1 Aug. 11, 2016

Related U.S. Application Data

(63) Continuation of application No. 14/500,145, filed on Sep. 29, 2014, now Pat. No. 9,344,329, which is a continuation of application No. 13/708,618, filed on Dec. 7, 2012, now Pat. No. 8,914,051.

(51) Int. Cl.

| | |
|---|---|
| ***H04W 4/22*** | (2009.01) |
| ***G06N 7/00*** | (2006.01) |
| ***H04W 4/12*** | (2009.01) |
| ***H04L 12/24*** | (2006.01) |
| ***H04L 29/08*** | (2006.01) |

(52) U.S. Cl.

CPC ......... *G06N 7/005* (2013.01); *H04L 41/0686* (2013.01); *H04L 67/22* (2013.01); *H04L 67/26* (2013.01); *H04W 4/12* (2013.01); *H04L 67/306* (2013.01); *H04W 4/22* (2013.01)

(58) Field of Classification Search

CPC .......... H04W 4/12; H04W 4/22; H04L 67/26; H04L 67/22

USPC ..... 455/404.2, 410, 411, 414.1, 466; 706/11

See application file for complete search history.

(56) References Cited

U.S. PATENT DOCUMENTS

| | | | | |
|---|---|---|---|---|
| 5,966,656 A * | 10/1999 | Elkin | ............... | H04M 1/72519 455/226.1 |
| 6,792,081 B1 | 9/2004 | Contractor | | |
| 8,218,735 B2 | 7/2012 | Brunson et al. | | |
| 8,914,051 B2 | 12/2014 | Daly et al. | | |
| 2010/0093380 A1 | 4/2010 | Gustafsson | | |

FOREIGN PATENT DOCUMENTS

EP 0598138 B1 8/1999

* cited by examiner

Primary Examiner — Sam Bhattacharya

(74) *Attorney, Agent, or Firm* — Baker & Hostetler LLP

(57) ABSTRACT

A network device may receive a subscriber's activity data for a plurality of network resources associated with the subscriber. The subscriber's activity data may be analyzed and a tailored notification instruction may be provided for alerting the subscriber.

20 Claims, 10 Drawing Sheets

INTELLIGENT SUBSCRIBER NOTIFICATION BASED ON A CONFIDENCE LEVEL OF VIEWING MESSAGES

CROSS-REFERENCE TO RELATED APPLICATIONS

This application is a continuation of, and claims priority to, U.S. Pat. No. 8,914,051, filed Dec. 7, 2012, and issued Dec. 16, 2014, and U.S. patent application Ser. No. 14/500,145, filed Sep. 29, 2014. The contents of U.S. Pat. No. 8,914,051 and U.S. patent application Ser. No. 14/500,145, are incorporated by reference herein in their entireties.

TECHNICAL FIELD

The technical field generally relates to telecommunications and more specifically relates to notification management.

BACKGROUND

The mobile telephone network, the static telephone network, the IP network, and other communication networks provides a myriad of communication options for users. If one seeks to alert an individual, it may be done by electronic mail, instant messaging, wired or wireless telephone, personal computer, pager, personal digital assistant, and Unified Messaging systems, to name but a few. With so many options, it may be difficult, to determine which option at a given point in time will provide the communicator who seeks to alert an individual with the highest likelihood of contacting the desired individual.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

A subscriber's activity data may include implicit responses to an alert message from a plurality of network resources. The subscriber's activity data may be analyzed and a tailored notification instruction may be created based on the analyzed subscriber data. In an embodiment, the notification instruction may comprise confidence levels that pertain to the likelihood an alert message may reach a network resource. A notification instruction may instruct a device on whether to send an alert message to a network resource based on the confidence level of the network resource.

BRIEF DESCRIPTION OF THE DRAWINGS

The following detailed description of example embodiments is better understood when read in conjunction with the appended drawings. For the purposes of illustration, the drawings show exemplary embodiments. The subject matter is not limited to the specific elements and instrumentalities disclosed. In the drawings.

DETAILED DESCRIPTION OF ILLUSTRATIVE EMBODIMENTS

Figure 1:
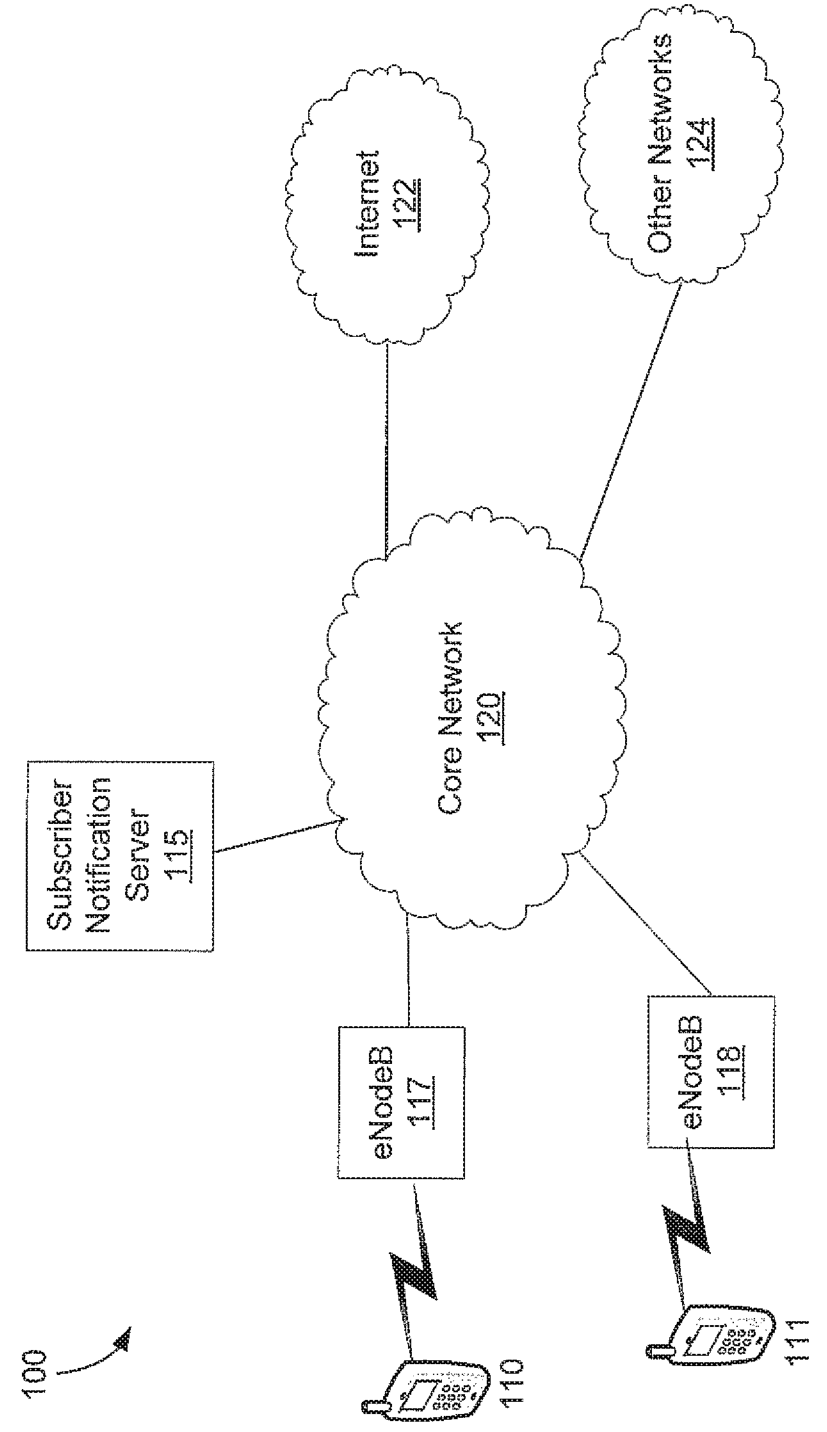
FIG. 1 illustrates a non-limiting exemplary network configuration for long term evolution (LTE) according to one or more disclosed embodiments of intelligent subscriber notification.

FIG. 1 is an exemplary illustration of a communications system 100 in which one or more of the disclosed embodiments may be implemented. In FIG. 1, a wireless transmit/receive unit (WTRU) 110 and WTRU 111 may be connected, respectively, to an evolved node B (eNodeB) 117 and eNodeB 118. The eNodeB 117 and eNodeB 118 may be connected to core network 120. Core network 120 may be connected with a subscriber notification server 115. As shown in FIG. 1, the communications system 100 may also include the Internet 122 and other networks 124. The disclosed embodiment contemplates any number of WTRUs, eNodeBs, networks, and/or network elements.

Subscriber notification server 115 may be a server that analyzes information that includes subscriber activity data (e.g., use of applications or other network resources) within communication system 100. Network resources as discussed herein may comprise network (e.g. WTRU) or services (e.g., e-mail or SMS). The subscriber activity data may comprise information regarding the interactions of a subscriber with network resources such as e-mail, voicemail, short message service, multimedia messaging service, voice (wireline or wireless), mobile devices, social media, television, and web browser, among other things, all of which may be current or historical information. The interaction information of the subscriber may include how often a network resource is accessed, at what time period a network resource is accessed, at what location the network resource is accessed, detected movement of a network device, and the like.

Figure 2:
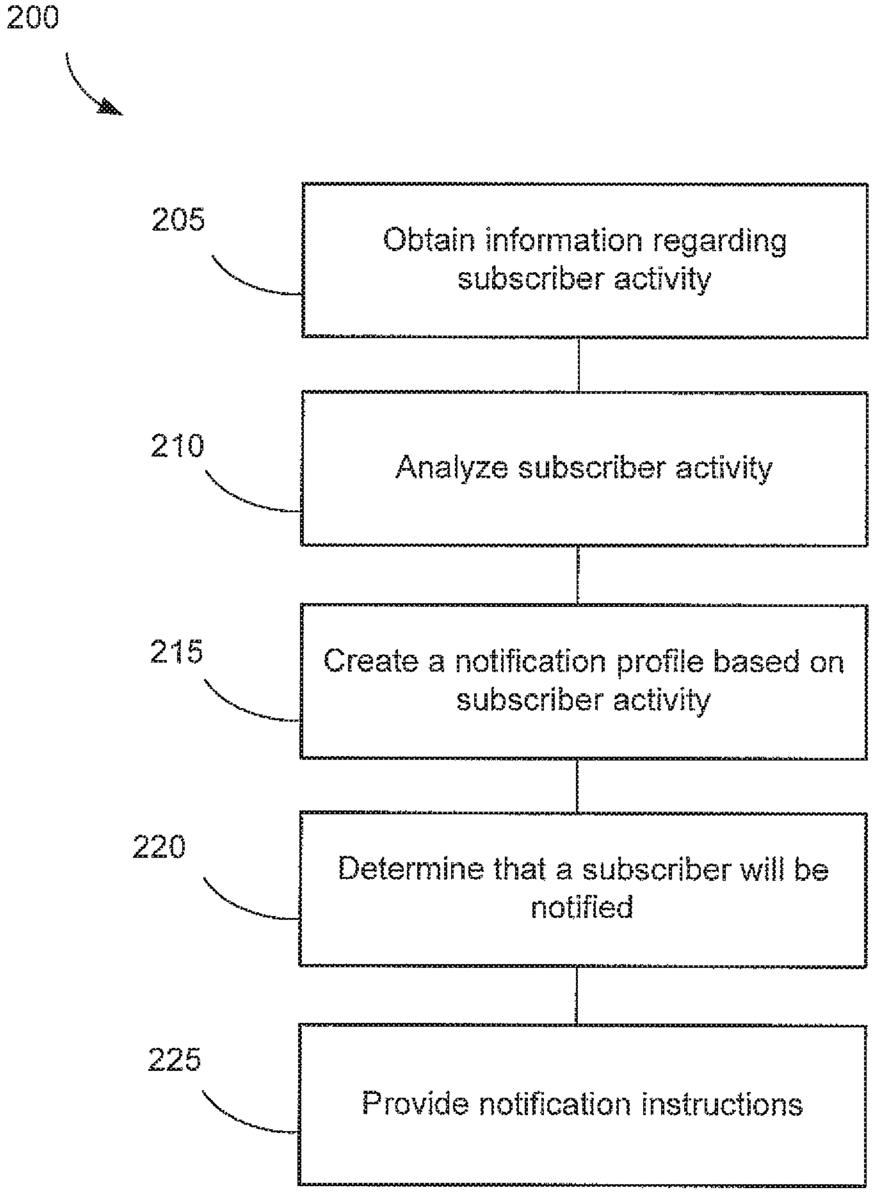
FIG. 2 illustrates a non-limiting exemplary method of implementing one or more disclosed embodiments of intelligent subscriber notification.

FIG. 2 illustrates a non-limiting exemplary method 200 of implementing one or more disclosed embodiments of intelligent subscriber notification. In method 200 at block 205, an intelligent subscriber notification server may obtain information regarding subscriber activity. A subscriber may be associated with one or more network resources. The subscriber's association may be determined based on common billing information, user profile information, or other cross-linked information. A subscriber may be considered a person, business, government, organization, family entity, and the like, for example.

At block 210, the intelligent subscriber notification server may analyze real-time subscriber activity or historical subscriber activity data. In an embodiment, because of real-time analysis it may be discovered that a subscriber is currently using a particular service (e.g., voice on a mobile phone) and interrupt the voice call to deliver an alert. The same premise for real-time subscriber activity may apply to other network resources mentioned herein. Analysis may be done for all subscriber activity or a subset of subscriber activity such as activities just related to alerts. Analysis of implicit or explicit responses to receiving a particular type of alert message may be interpreted as an indication that a particular type of alert should or should not be received by a subscriber via a particular network resource. In an embodiment, an explicit alert response may be characterized as a selection of a button or another similar affirmative action by the subscriber) provided by an alert presentation interface that acknowledges the alert or indicates a preference for receiving alerts of the same or similar type. In an embodiment, an implicit alert response may be characterized as a non-affirmative response to a particular type of alert that may be interpreted as an indication that a particular type of alert should or should not be received by the subscriber. For example, an implicit alert response may be the act of not opening an e-mail or other message that comprises an alert.

At block 215, a notification profile may be created based on the analyzed subscriber activity data. The created notification profile may comprise information concerning the network resources that the subscriber is most likely to view, listen to, or otherwise interact with in a manner that the subscriber would timely recognize the existence of an alert. The time period may be set by a subscriber, network operator, or other party. In an embodiment, the notification profile may be created periodically (e.g., daily or monthly). The created notification profile may have a plurality of notification instructions for different scenarios. The created profile may provide alert confidence levels for each network resource for a particular time period, location, situation (e.g., weather), severity level, or the like. In an embodiment, an alert may be sent to network resources that cross a designated threshold alert confidence level. Alert confidence levels for a network resource may be indicative of how likely a subscriber may view an alert message. Crossing or meeting a threshold as discussed herein may be described as surpassing a number that is prescribed in order to determine when some action is triggered. For example, a threshold may be crossed if the number of keepalives from a device is below a certain amount (e.g., 3) within a timeframe (e.g., 10 minutes) and therefore an alert may be triggered. In another example, a threshold may be crossed if the number of errors is above a certain amount (e.g., 100) within a certain time frame (e.g., 1 minute) and therefore an alert may be triggered.

At block 220, it is determined that a subscriber will be notified. The determination may be based on severe or urgent emergency situations (e.g., adverse weather or missing child broadcast) or less severe situations such as a planned network maintenance outage, traffic alert, or an advertisement. At block 225, notification instructions may be provided. Notification instructions may come from the notification profile or real-time analysis of subscriber activity data. In an embodiment, the process in which the subscriber will be notified (e.g., notification instruction) may be based on an assigned severity level of an alert.

Figure 3:
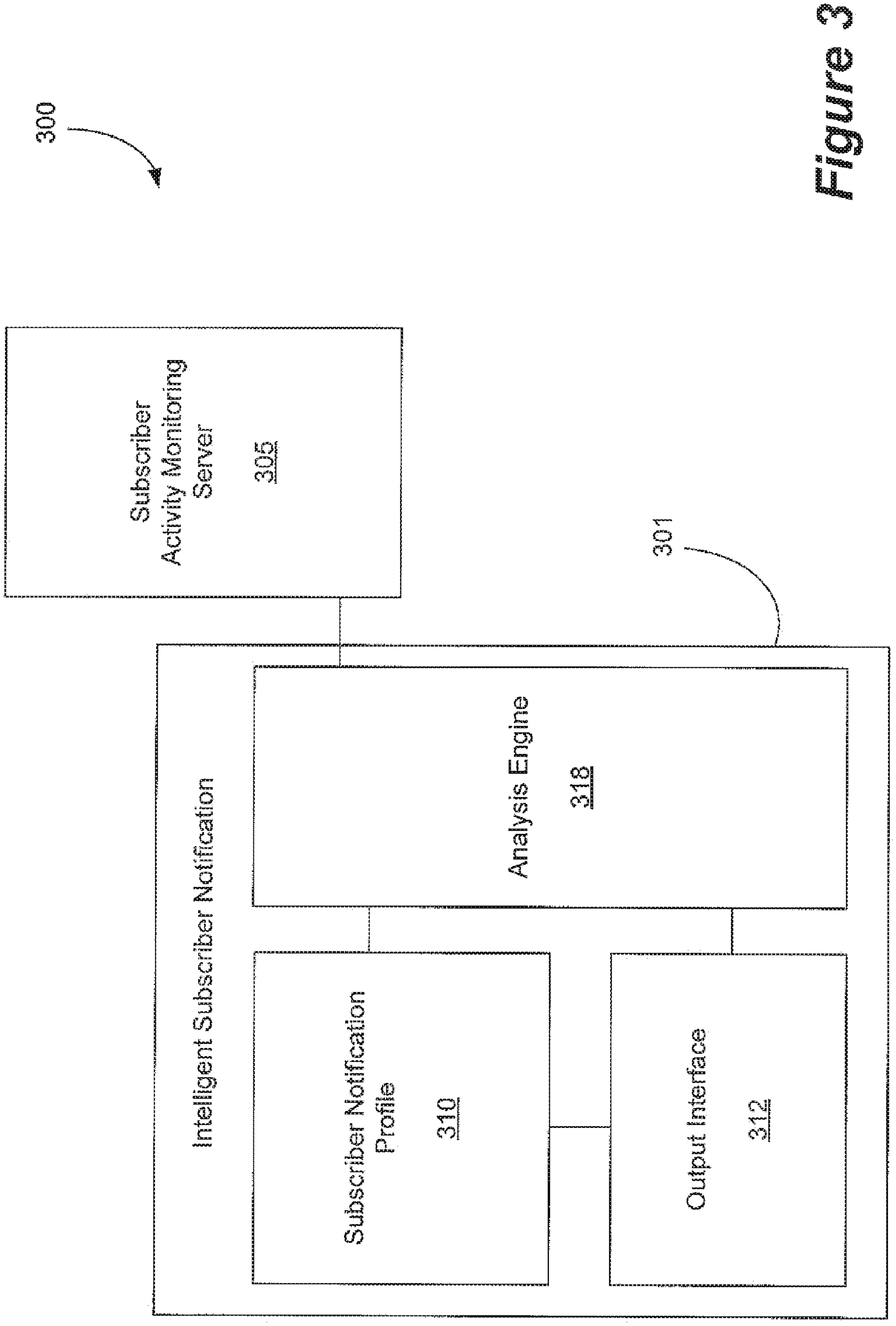
FIG. 3 illustrates a non-limiting exemplary network configuration according to one or more disclosed embodiments of intelligent subscriber notification.

FIG. 3 is an exemplary embodiment of a system 300 that may implement an intelligent subscriber notification server 301. The intelligent subscriber notification server 301 may be communicatively connected to a subscriber activity monitoring server 305. The subscriber activity monitoring server 305 may compile subscriber activity data from network resources and communicate the subscriber activity data to an analysis engine 318. The subscriber activity data may comprise information regarding a network resource that may be sent to a log file. The events may be consumed in real-time or from a log file and used by analysis engine 318 to determine the subscriber activity that is most likely to alert the subscriber for timely alert recognition. Subscriber activity monitoring server 305 may probe network resources periodically for subscriber activity data. In an embodiment, a subscriber activity monitoring server 305 may probe more frequently when an adverse condition (e.g., hurricane or blizzard) is expected. In an embodiment subscriber activity monitoring server 305 may have subscriber activity data that includes environment information (e.g., a weather forecast, cyclic redundancy errors, amount of data traffic across a link, and type of data traffic across the link) which may help the analysis engine 318 determine timely subscriber alert recognition and create the subscriber notification profile.

The subscriber notification profile 310 may include identified network resources associated with the subscriber with corresponding confidence levels. The confidence levels may be indicative of an order in which alert messages may be sent to the subscriber. For example, if the confidence level is based on a 100 point scale, it may be determined that the closer the confidence level is to 100 the more likely a subscriber will view the alert message. In an embodiment, the alert message may be sent in order of highest confidence level to first service (e.g., e-mail). Another alert message may be sent when a determine wait time is exceeded. The wait time period may be assigned by a network operator, subscriber, or otherwise determined based on previous activity of a subscriber with subscriber associated network resources. The wait time period for the acknowledgement and determined subsequent actions may be part of subscriber notification profile 310. If there is no acknowledgement within the determined period of time, then another alert message may be sent to another service (e.g., SMS) with the next highest confidence level. Sending alert messages one at a time based on confidence level may minimize the bandwidth used to send an alert message to a subscriber.

In an embodiment, analysis engine 318 may create a subscriber notification profile based on a group of subscribers. For example, if a relatively new subscriber has minimal subscriber activity data, then the subscriber notification profile 310 may be based on information gathered from a similar subscriber group demographic (e.g., age or occupation). In an embodiment, subscriber notification profile 310 may also comprise information with regard to alert messaging to a subscriber based on location, time, weather forecast, and the like. For example, confidence levels may be assigned for sending an alert to services during a particular time of day when an associated device is in a particular location. In another embodiment, subscriber notification profile 310 may comprise an alert message notification process based on the severity level of the alert. For example, if the alert has a severity level indicative of an emergency, then the alert may initially be sent to all the network resources associated with the subscriber. Follow-up messages may be sent to network resources within a selected confidence level. The subscriber notification profile 310 may be created periodically (e.g., 10 minute, hour, or day increments).

The analysis engine 318 and subscriber notification profile 310 may be connected with an output interface 312. The output interface 312 may communicate subscriber notification profile 310 or real-time analysis of analysis engine 318. In an embodiment, subscriber notification profile may automatically be sent to a network operator which may include an outage ticketing system. In an embodiment, there may be an interface with other systems for automatic communication of an alert message or profile which may be based on the subscriber notification profile 310 or a real-time analysis by analysis engine 318.

As discussed herein, a subscriber notification server 301 may be a server that analyzes subscriber activity data within a communication system. For example, subscriber activity data processed by analysis engine 318 may comprise information with regards to interactions of a subscriber with network resources such as e-mail, voicemail, short message service, multimedia messaging service, voice (wireline or wireless), mobile devices, social media application, television, and web browser, among other things. Subscriber activity data may comprise explicit responses of pressing an acknowledgement button, responding to a SMS or e-mail message, or the like when receiving an alert or a survey regarding an alert. A survey to a subscriber regarding an alert may comprise questions for a preferred service for receiving an alert or whether a sent alert was viewed within a specific time period.

In an embodiment, a map or global position system (GPS) application may receive an alert message that includes an alternate route. A device associated with the subscriber may travel along the alternate route within a specified time frame after receiving the alert message. This interaction of going to or not going to a location associated with an alert message may be considered an implicit response and maybe taken into account when creating a subscriber notification profile or other analysis of an intelligent subscriber notification server. In another embodiment, an implicit response may include checking alert related voicemail. The voicemail may be locally stored voicemail (e.g., visual voicemail) or remotely stored voicemail. In addition, an implicit response may include answering an alert related phone call, accessing alert related text messages, responding to social media related messages, and the like, as well as consideration of time frames and locations. These interactions with a network resource associated with an alert message or the context of the alert message (especially when not part of a normal/non-alert related subscriber activity) may be considered an implicit response and maybe taken into account when creating a subscriber notification profile or other analysis of an intelligent subscriber notification server. Example contexts of an alert message, as discussed herein, may be an alternate route received in an alert message, a warning to stay away from a location for a time period received in an alert message, a product purchase suggestion (e.g., advertisement) in an alert message, an instruction to call a phone number in an alert message, or the like.

In an embodiment, subscriber notification profile 310 may have instructions to limit the function of a network resource until an alert is acknowledged. The limitation may be based on the severity level of the alert message. For example, if the alert message has a severity level indicative of an emergency a web browser of a mobile device may only be allowed to access a website associated with the alert message. In another example, e-mail may be restricted so that only the alert message associated e-mail may be viewed or accessed. This restriction or limitation may remain until the emergency is over, until the subscriber has opened the page associated with the alert message, or another selected time period or action. The network resource may be limited based on an analysis of subscriber activity data.

Figure 4:
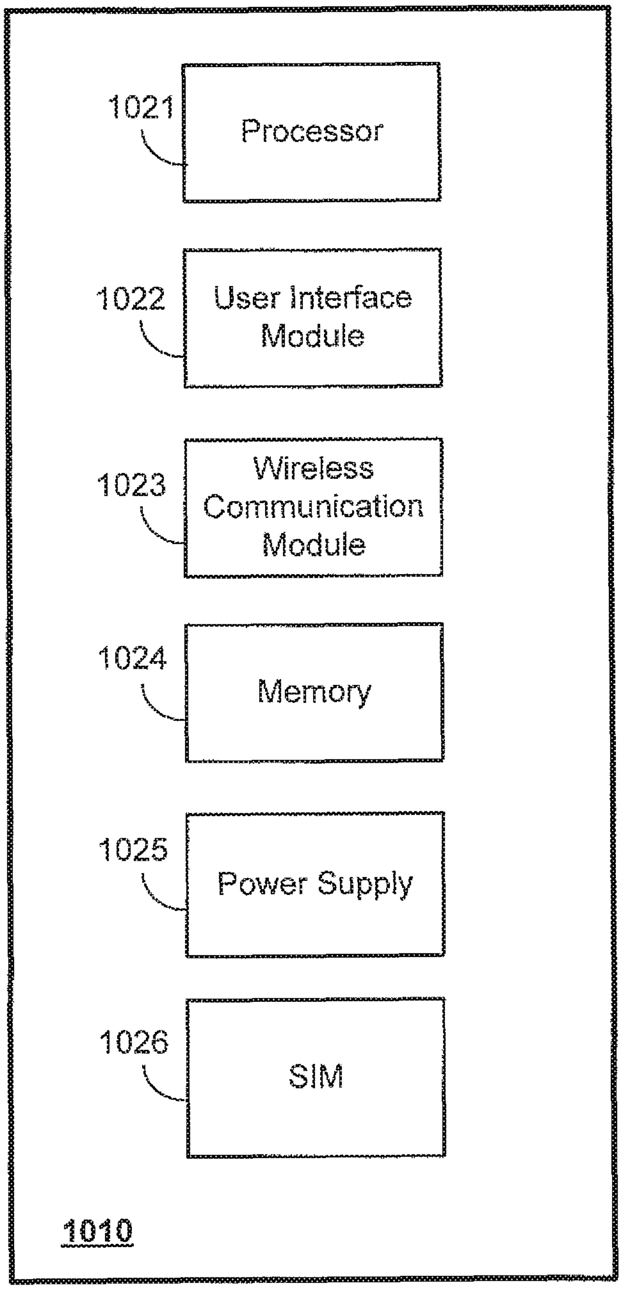
FIG. 4 is a block diagram of a non-limiting exemplary mobile device in which aspects of one or more disclosed embodiments of intelligent subscriber notification may be implemented.

FIG. 4 illustrates an example wireless device 1010 that may be used in connection with an embodiment. References will also be made to other figures of the present disclosure as appropriate. For example, mobile devices 110 and 111 may be wireless devices of the type described in regard to FIG. 4, and may have some, all, or none of the components and modules described in regard to FIG. 4. It will be appreciated that the components and modules of wireless device 1010 illustrated in FIG. 4 are illustrative, and that any number and type of components and/or modules may be present in wireless device 1010. In addition, the functions performed by any or all of the components and modules illustrated in FIG. 4 may be performed by any number of physical components. Thus, it is possible that in some embodiments the functionality of more than one component and/or module illustrated in FIG. 4 may be performed by any number or types of hardware or a combination of hardware and software.

Processor 1021 may be any type of circuitry that performs operations on behalf of wireless device 1010. Such circuitry may include circuitry and other components that enable processor 1021 to perform any of the functions and methods described herein. Such circuitry and other components may also enable processor 1021 to communicate and/or interact with other devices and components, for example any other component of device of wireless device 1010, in such a manner as to enable processor 118 and such other devices and/or components to perform any of the disclosed functions and methods. In one embodiment, processor 1021 executes software (computer readable instructions stored in a computer readable storage medium which is not a transient signal) that may include functionality related to intelligent subscriber notification, for example. User interface module 1022 may be any type or combination of hardware or a combination of hardware and software that enables a user to operate and interact with wireless device 1010, and, in one embodiment, to interact with a system or software enabling the user to place, request, and/or receive calls, text communications of any type, voicemail, voicemail notifications, voicemail content and/or data, and/or a system or software enabling the user to view, modify, or delete related software objects. For example, user interface module 1022 may include a display, physical and/or "soft" keys, voice recognition software, a microphone, a speaker and the like. Wireless communication module 1023 may be any type of transceiver including any combination of hardware or a combination of hardware and software that enables wireless device 1010 to communicate with wireless network equipment. Memory 1024 enables wireless device 1010 to store information, such as APNs, MNCs, MCCs, text communications content and associated data, multimedia content, software to efficiently process radio resource requests and service requests, and radio resource request processing preferences and configurations. Memory 1024 may take any form, such as internal random access memory (RAM), an SD card, a microSD card and the like. Power supply 1025 may be a battery or other type of power input (e.g., a charging cable that is connected to an electrical outlet, etc.) that is capable of powering wireless device 1010. SIM 1026 may be any type Subscriber Identity Module and may be configured on a removable or non-removable SIM card that allows wireless device 1010 to store data on SIM 1026.

Figure 5:
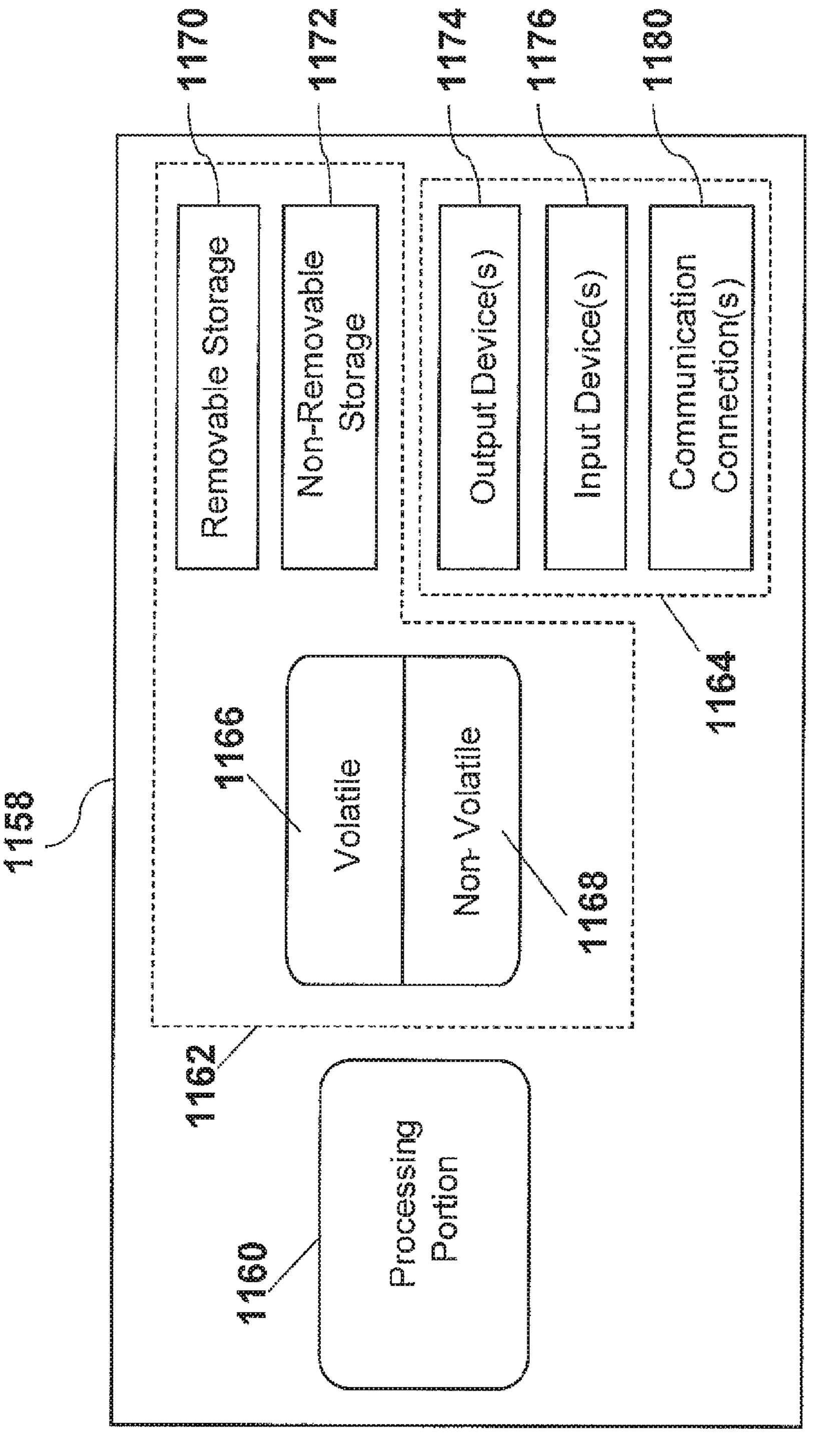
FIG. 5 is a block diagram of a non-limiting exemplary processor in which aspects of one or more disclosed embodiments of intelligent subscriber notification may be implemented.

FIG. 5 is a block diagram of an example processor 1158 which may be employed in any of the embodiments described herein, including as one or more components of mobile devices 110 and 111, as one or more components of network equipment such as MMEs, and HSSs, and/or CMS, or any other component of networks 110 and 111, and/or any related equipment, and/or as one or more components of any third party system or subsystem that may implement any portion of the subject matter described herein. It is emphasized that the block diagram depicted in FIG. 5 is exemplary and not intended to imply a specific implementation. Thus, the processor 1158 can be implemented in a single processor or multiple processors. Multiple processors can be distributed or centrally located. Multiple processors can communicate wirelessly, via hard wire, or a combination thereof. Processor 1158 may include circuitry and other components that enable processor 1158 to perform any of the functions and methods described herein. Such circuitry and other components may also enable processor 1158 to communicate and/or interact with other devices and components, for example any other component of any device disclosed herein or any other device, in such a manner as to enable processor 1158 and such other devices and/or components to perform any of the disclosed functions and methods.

As depicted in FIG. 5, the processor 1158 comprises a processing portion 1160, a memory portion 1162, and an input/output portion 1164. The processing portion 1160, memory portion 1162, and input/output portion 1164 are coupled together (coupling not shown in FIG. 5) to allow communications between these portions. The input/output portion 1164 is capable of providing and/or receiving components, commands, and/or instructions, utilized to, for example, request and receive APNs, MNCs, and/or MCCs, establish and terminate communications sessions, transmit and receive service requests and data access request data and responses, transmit, receive, store and process text, data, and voice communications, execute software that efficiently processes radio resource requests, receive and store service requests and radio resource requests, radio resource request processing preferences and configurations, and/or perform any other function described herein.

The processor 1158 may be implemented as a client processor and/or a server processor. In a basic configuration, the processor 1158 may include at least one processing portion 1160 and memory portion 1162. The memory portion 1162 can store any information utilized in conjunction with establishing, transmitting, receiving, and/or processing text, data, and/or voice communications, communications-related data and/or content, voice calls, other telephonic communications, etc. For example, the memory portion is capable of storing APNs, MNCs, MCCs, service requests, radio resource requests, QoS and/or APN parameters, software for intelligent subscriber notification, text and data communications, calls, voicemail, multimedia content, visual voicemail applications, etc. Depending upon the exact configuration and type of processor, the memory portion 1162 can be volatile (such as RAM) 1166, non-volatile (such as ROM, flash memory, etc.) 1168, or a combination thereof. The processor 1158 can have additional features/functionality. For example, the processor 1158 may include additional storage (removable storage 1170 and/or non-removable storage 1172) including, but not limited to, magnetic or optical disks, tape, flash, smart cards or a combination thereof. Computer storage media, such as memory and storage elements 1162, 1170, 1172, 1166, and 1168, may include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium that can be used to store the desired information and that can be accessed by the processor 1158. Any such computer storage media may be part of the processor 1158 and is not a transient signal.

The processor 1158 may also contain the communications connection(s) 1180 that allow the processor 1158 to communicate with other devices, for example through a radio access network (RAN). Communications connection(s) 1180 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein includes both storage media and communication media, wherein storage media is not a transient or propagated signal. The processor 1158 also can have input device (s) 1176 such as keyboard, keypad, mouse, pen, voice input device, touch input device, etc. Output device(s) 1174 such as a display, speakers, printer, etc. also can be included.

A RAN as described herein may comprise any telephony radio network, or any other type of communications network, wireline or wireless, or any combination thereof. The following description sets forth some exemplary telephony radio networks, such as the global system for mobile communications (GSM), and non-limiting operating environments. The below-described operating environments should be considered non-exhaustive, however, and thus the below-described network architectures merely show how intelligent subscriber notification may be implemented with stationary and non-stationary network structures and architectures in order to do intelligent subscriber notification. It can be appreciated, however, that intelligent subscriber notification as described herein may be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

The exemplary GSM/GPRS environment and services described herein also may be extended to 3G services, such as Universal Mobile Telephone System (UMTS), Frequency Division Duplexing (FDD) and Time Division Duplexing (TDD), High Speed Packet Data Access (HSPDA), cdma2000 1× Evolution Data Optimized (EVDO), Code Division Multiple Access-2000 (cdma2000 3×), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), 4G Services such as Long Term Evolution (LTE), etc., as well as to other network services that become available in time. In this regard, intelligent subscriber notification may be applied independently of the method of data transport and does not depend on any particular network architecture or underlying protocols.

Figure 6:
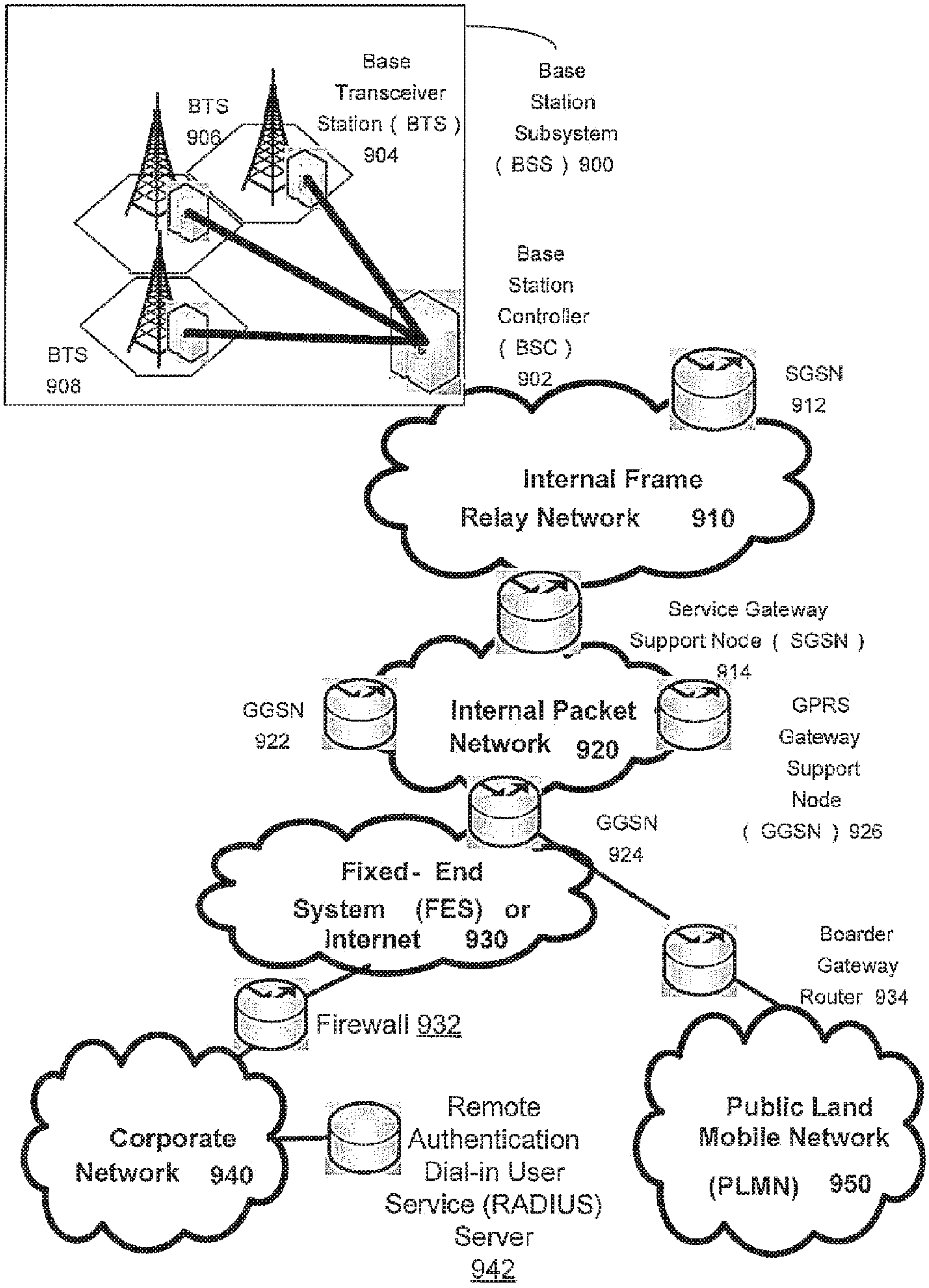
FIG. 6 is a block diagram of a non-limiting exemplary packet-based mobile cellular network environment, such as a GPRS network, in which one or more disclosed embodiments of intelligent subscriber notification may be implemented.

FIG. 6 depicts an overall block diagram of an exemplary packet-based mobile cellular network environment, such as a GPRS network, in which intelligent subscriber notification such as those described herein may be practiced. In an example configuration, any RAN as described herein may be encompassed by or interact with the network environment depicted in FIG. 6. Similarly, mobile devices 110 and 111 may communicate or interact with a network environment such as that depicted in FIG. 6. In such an environment, there may be a plurality of Base Station Subsystems (BSS) 900 (only one is shown), each of which comprises a Base Station Controller (BSC) 902 serving a plurality of Base Transceiver Stations (BTS) such as BTSs 904, 906, and 908. BTSs 904, 906, 908, etc. are the access points where users of packet-based mobile devices (e.g., mobile devices 110 and 111) become connected to the wireless network. In exemplary fashion, the packet traffic originating from user devices (e.g., mobile devices 110 and 111) may be transported via an over-the-air interface to a BTS 908, and from the BTS 908 to the BSC 902. Base station subsystems, such as BSS 900, may be a part of internal frame relay network 910 that can include Service GPRS Support Nodes (SGSN) such as SGSN 912 and 914. Each SGSN may be connected to an internal packet network 920 through which a SGSN 912, 914, etc. may route data packets to and from a plurality of gateway GPRS support nodes (GGSN) 922, 924, 926, etc. As illustrated, SGSN 914 and GGSNs 922, 924, and 926 may be part of internal packet network 920. Gateway GPRS serving nodes 922, 924 and 926 may provide an interface to external Internet Protocol (IP) networks, such as Public Land Mobile Network (PLMN) 950, corporate intranets 940, or Fixed-End System (FES) or the public Internet 930. As illustrated, subscriber corporate network 940 may be connected to GGSN 924 via firewall 932, and PLMN 950 may be connected to GGSN 924 via border gateway router 934. The Remote Authentication Dial-In User Service (RADIUS) server 942 may be used for caller authentication when a user of a mobile cellular device calls corporate network 940.

Generally, there can be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells may be typically used in urban areas. Pico cells are small cells having a diameter of a few dozen meters. Pico cells may be used mainly indoors. On the other hand, umbrella cells may be used to cover shadowed regions of smaller cells and fill in gaps in coverage between those cells.

Figure 7:
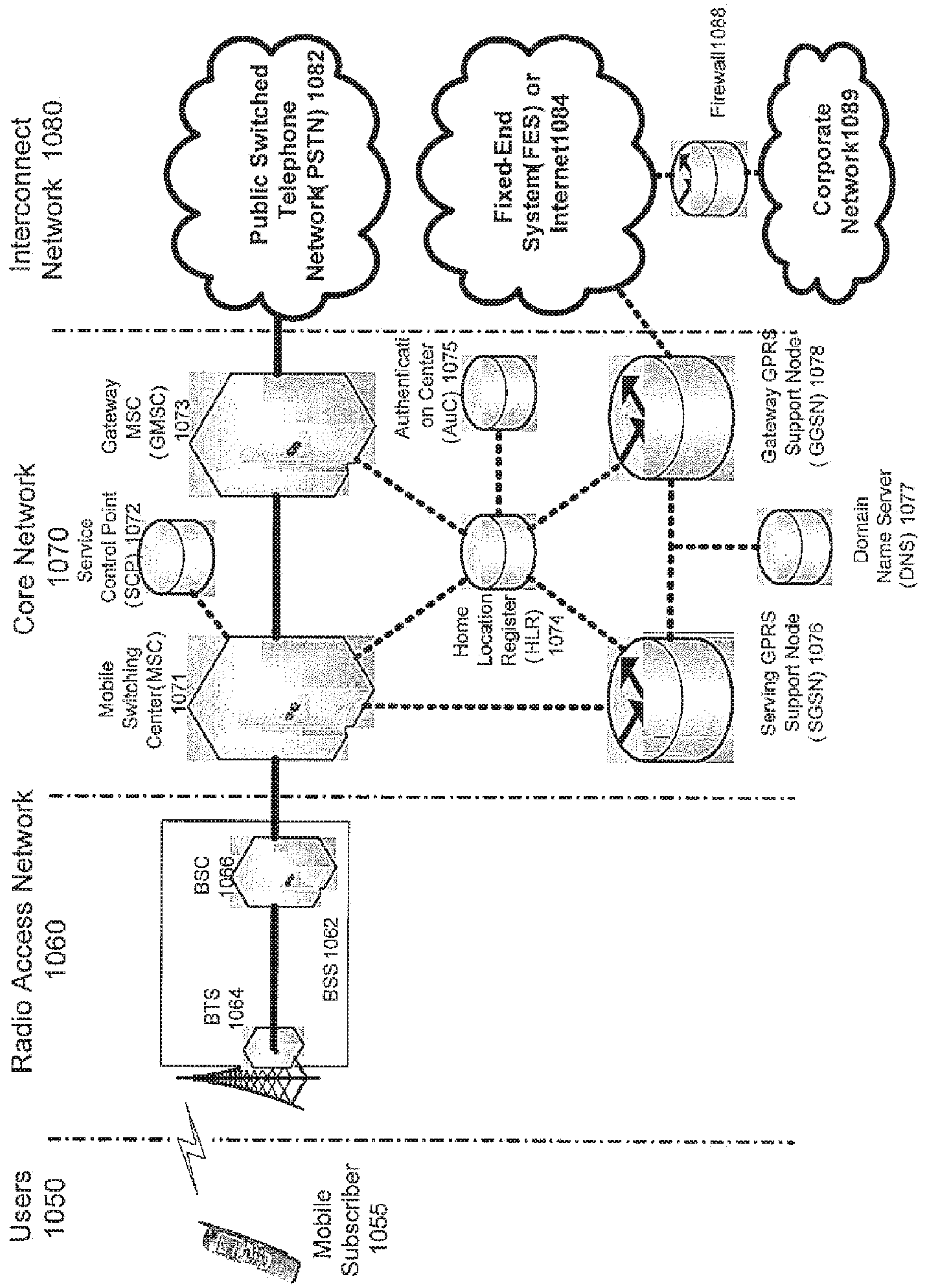
FIG. 7 illustrates a non-limiting exemplary architecture of a typical GPRS network, segmented into four groups, in which one or more disclosed embodiments of intelligent subscriber notification may be implemented.

FIG. 7 illustrates an architecture of a typical GPRS network in which one or more disclosed embodiments of intelligent subscriber notification may be implemented. The architecture if FIG. 7 is segmented into four groups: users 1050, radio access network 1060, core network 1070, and interconnect network 1080. Users 1050 may comprise a plurality of end users (though only mobile subscriber 1055 is shown in FIG. 7). In an example embodiment, the device depicted as mobile subscriber 1055 may comprise any of mobile devices 110 and 111. Radio access network 1060 comprises a plurality of base station subsystems such as BSSs 1062, which include BTSs 1064 and BSCs 1066. Core network 1070 comprises a host of various network elements. As illustrated here, core network 1070 may comprise Mobile Switching Center (MSC) 1071, Service Control Point (SCP) 1072, gateway MSC 1073, SGSN 1076, Home Location Register (HLR) 1074, Authentication Center (AuC) 1075, Domain Name Server (DNS) 1077, and GGSN 1078. Interconnect network 1080 may also comprise a host of various networks and other network elements. As illustrated in FIG. 7, interconnect network 1080 comprises Public Switched Telephone Network (PSTN) 1082, Fixed-End System (FES) or Internet 1084, firewall 1088, and Corporate Network 1089.

A mobile switching center may be connected to a large number of base station controllers. At MSC 1071, for instance, depending on the type of traffic, the traffic may be separated in that voice may be sent to Public Switched Telephone Network (PSTN) 1082 through Gateway MSC (GMSC) 1073, and/or data may be sent to SGSN 1076 that may send the data traffic to GGSN 1078 for further forwarding.

When MSC 1071 receives call traffic, for example, from BSC 1066, it may send a query to a database hosted by SCP 1072. The SCP 1072 may process the request and may issue a response to MSC 1071 so that it may continue call processing as appropriate.

The HLR 1074 may be a centralized database for users to register to the GPRS network. In some embodiments, HLR 1074 may be a device such as HSSs. HLR 1074 may store static information about the subscribers such as the International Mobile Subscriber Identity (IMSI), APN profiles as described herein, subscribed services, and a key for authenticating the subscriber. HLR 1074 may also store dynamic subscriber information such as dynamic APN profiles and the current location of the mobile subscriber. HLR 1074 may also serve to intercept and determine the validity of destination numbers in messages sent from a device, such as mobile subscriber 1055, as described herein. Associated with HLR 1074 may be AuC 1075. AuC 1075 may be a database that contains the algorithms for authenticating subscribers and may include the associated keys for encryption to safeguard the user input for authentication.

In the following, depending on context, the term "mobile subscriber" sometimes refers to the end user and sometimes to the actual portable device, such as mobile devices 110 and 111, used by an end user of a mobile cellular service or a wireless provider. When a mobile subscriber turns on his or her mobile device, the mobile device may go through an attach process by which the mobile device attaches to an SGSN of the GPRS network. In FIG. 7, when mobile subscriber 1055 initiates the attach process by turning on the network capabilities of the mobile device, an attach request may be sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 may request more information from mobile subscriber 1055. This information may be used to authenticate mobile subscriber 1055 to SGSN 1076 by HLR 1074. Once verified, SGSN 1076 sends a location update to HLR 1074 indicating the change of location to a new SGSN, in this case SGSN 1076. HLR 1074 may notify the old SGSN, to which mobile subscriber 1055 was attached before, to cancel the location process for mobile subscriber 1055. HLR 1074 may then notify SGSN 1076 that the location update has been performed. At this time, SGSN 1076 sends an Attach Accept message to mobile subscriber 1055, which in turn sends an Attach Complete message to SGSN 1076.

After attaching itself to the network, mobile subscriber 1055 may then go through the authentication process. In the authentication process, SGSN 1076 may send the authentication information to HLR 1074, which may send information back to SGSN 1076 based on the user profile that was part of the user's initial setup. The SGSN 1076 may then send a request for authentication and ciphering to mobile subscriber 1055. The mobile subscriber 1055 may use an algorithm to send the user identification (ID) and password to SGSN 1076. The SGSN 1076 may use the same algorithm and compares the result. If a match occurs, SGSN 1076 authenticates mobile subscriber 1055.

Next, the mobile subscriber 1055 may establish a user session with the destination network, corporate network 1089, by going through a Packet Data Protocol (PDP) activation process. Briefly, in the process, mobile subscriber 1055 may request access to an Access Point Name (APN), for example, UPS.com, and SGSN 1076 may receive the activation request from mobile subscriber 1055. SGSN 1076 may then initiate a Domain Name Service (DNS) query to learn which GGSN node has access to the UPS.com APN. The DNS query may be sent to the DNS server within the core network 1070, such as DNS 1077, that may be provisioned to map to one or more GGSN nodes in the core network 1070. Based on the APN, the mapped GGSN 1078 may access the requested corporate network 1089. The SGSN 1076 may then send to GGSN 1078 a Create Packet Data Protocol (PDP) Context Request message that contains necessary information. The GGSN 1078 may send a Create PDP Context Response message to SGSN 1076, which may then send an Activate PDP Context Accept message to mobile subscriber 1055.

Once activated, data packets of the call made by mobile subscriber 1055 may then go through radio access network 1060, core network 1070, and interconnect network 1080, in a particular fixed-end system, or Internet 1084 and firewall 1088, to reach corporate network 1089.

Thus, network elements that can invoke the functionality of intelligent subscriber notification such as those described herein may include, but are not limited to, Gateway GPRS Support Node tables, Fixed End System router tables, firewall systems, VPN tunnels, and any number of other network elements as required by the particular digital network.

Figure 8:
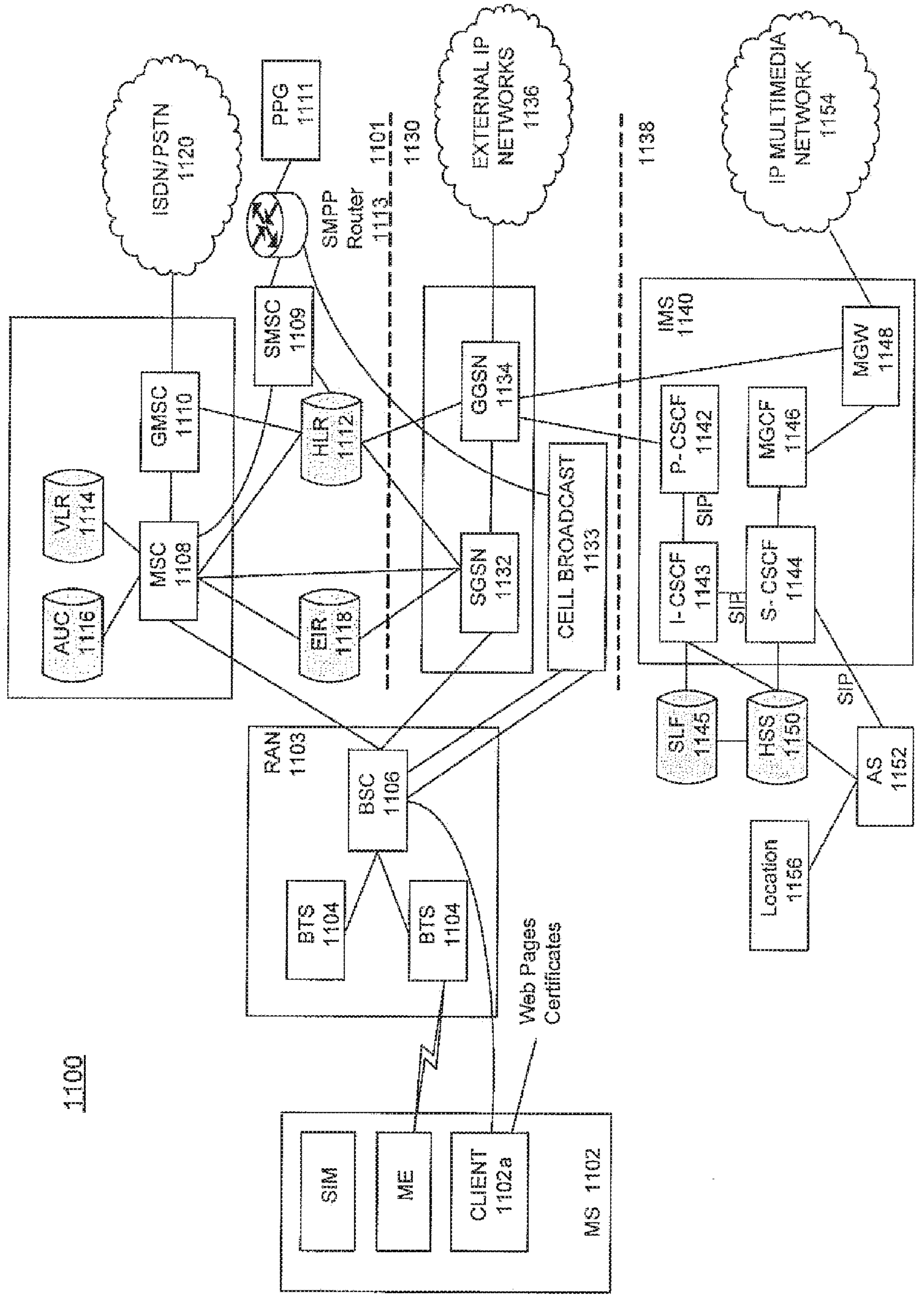
FIG. 8 illustrates a non-limiting alternate block diagram of an exemplary GSM/GPRS/IP multimedia network architecture in which one or more disclosed embodiments of intelligent subscriber notification may be implemented.

FIG. 8 illustrates another exemplary block diagram view of a GSM/GPRS/IP multimedia network architecture 1100 in which the systems and methods for intelligent subscriber notification such as those described herein may be incorporated. As illustrated, architecture 1100 of FIG. 8 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile telephone or a laptop computer (e.g., mobile devices 110 and 111) that is used by mobile subscribers, in one embodiment with a Subscriber identity Module (SIM). The SIM includes an International Mobile Subscriber Identity (IMSI), which is a unique identifier of a subscriber. The SIM may also include APNs. The BTS 1104 may be physical equipment, such as a radio tower, that enables a radio interface to communicate with the MS. Each BTS may serve more than one MS. The BSC 1106 may manage radio resources, including the BTS. The BSC may be connected to several BTSs. The BSC and BTS components, in combination, are generally referred to as a base station (BSS) or radio access network (RAN) 1103.

The GSM core network 1101 may also include a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 may perform a switching function for the network. The MSC may also perform other functions, such as registration, authentication, location updating, handovers, and call routing. The GMSC 1110 may provide a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 may be a database that may contain administrative information regarding each subscriber registered in a corresponding GSM network. Such information may include APNs and APN profiles. The HLR 1112 may also contain the current location of each MS. The VLR 1114 may be a database that contains selected administrative information from the HLR 1112. The VLR may contain information necessary for call control and provision of subscribed services for each MS currently located in a geographical area controlled by the VLR. The HLR 1112 and the VLR 1114, together with the MSC 1108, may provide the call routing and roaming capabilities of GSM. The AuC 1116 may provide the parameters needed for authentication and encryption functions. Such parameters allow verification of a subscriber's identity. The EIR 1118 may store security-sensitive information about the mobile equipment.

A Short Message Service Center (SMSC) 1109 allows one-to-one short message service (SMS), or multimedia message service (MMS), messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 may be provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as voice, data, short message service (SMS), and multimedia message service (MMS), the MS may first register with the network to indicate its current location by performing a location update and IMSI attach procedure. MS 1102 may send a location update including its current location information to the MSC/VLR, via BTS 1104 and BSC 1106. The location information may then be sent to the MS's HLR. The HLR may be updated with the location information received from the MSC/VLR. The location update may also be performed when the MS moves to a new location area. Typically, the location update may be periodically performed to update the database as location updating events occur.

GPRS network 1130 may be logically implemented on the GSM core network architecture by introducing two packet-switching network nodes, a serving GPRS support node (SGSN) 1132, a cell broadcast and a Gateway GPRS support node (GGSN) 1134. The SGSN 1132 may be at the same hierarchical level as the MSC 1108 in the GSM network. The SGSN may control the connection between the GPRS network and the MS 1102. The SGSN may also keep track of individual MS's locations and security functions and access controls.

Cell Broadcast Center (CBC) 1133 may communicate cell broadcast messages that are typically delivered to multiple users in a specified area. Cell Broadcast is one-to-many geographically focused service. It enables messages to be communicated to multiple mobile telephone customers who are located within a given part of its network coverage area at the time the message is broadcast.

GGSN 1134 may provide a gateway between the GPRS network and a public packet network (PDN) or other IP networks 1136. That is, the GGSN may provide interworking functionality with external networks, and set up a logical link to the MS through the SGSN. When packet-switched data leaves the GPRS network, it may be transferred to an external TCP-IP network 1136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

GPRS network 1130 may be designed to operate in three network operation modes (NOM1, NOM2 and NOM3). A network operation mode of a GPRS network may be indicated by a parameter in system information messages transmitted within a cell. The system information messages may direct an MS where to listen for paging messages and how to signal towards the network. The network operation mode represents the capabilities of the GPRS network. In a NOM1 network, a MS may receive pages from a circuit switched domain (voice call) when engaged in a data call. The MS may suspend the data call or take both simultaneously, depending on the ability of the MS. In a NOM2 network, a MS may not receive pages from a circuit switched domain when engaged in a data call, since the MS may be receiving data and may not be listening to a paging channel. In a NOM3 network, a MS may monitor pages for a circuit switched network while receiving data and vice versa.

The IP multimedia network 1138 was introduced with 3GPP Release 5, and may include IP multimedia subsystem (IMS) 1140 to provide rich multimedia services to end users. A representative set of the network entities within IMS 1140 are a call/session control function (CSCF), a media gateway control function (MGCF) 1146, a media gateway (MGW) 1148, and a master subscriber database, called a home subscriber server (HSS) 1150. HSS 1150 may be common to GSM core network 1101, GPRS network 1130 as well as IP multimedia network 1138.

IP multimedia system 1140 may be built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 may forward session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

I-CSCF 1143 forms an entrance to a home network and hides the inner topology of the home network from other networks and provides flexibility for selecting an S-CSCF. I-CSCF 1143 may contact subscriber location function (SLF) 1145 to determine which HSS 1150 to use for the particular subscriber, if multiple HSSs 1150 are present. S-CSCF 1144 may perform the session control services for MS 1102. This includes routing originating sessions to external networks and routing terminating sessions to visited networks. S-CSCF 1144 may also decide whether an application server (AS) 1152 is required to receive information on an incoming SIP session request to ensure appropriate service handling. This decision may be based on information received from HSS 1150 (or other sources, such as application server 1152). AS 1152 may also communicate to location server 1156 (e.g., a Gateway Mobile Location Center (GMLC)) that provides a position (e.g., latitude/longitude coordinates) of MS 1102.

HSS 1150 may contain a subscriber profile and keep track of which core network node is currently handling the subscriber. It may also support subscriber authentication and authorization functions (AAA). In networks with more than one HSS 1150, a subscriber location function provides information on the HSS 1150 that contains the profile of a given subscriber.

MGCF 1146 may provide interworking functionality between SIP session control signaling from the IMS 1140 and ISUP/BICC call control signaling from the external GSTN networks (not shown.) It may also control the media gateway (MGW) 1148 that provides user-plane interworking functionality (e.g., converting between AMR- and PCM-coded voice.) MGW 1148 may also communicate with other IP multimedia networks 1154.

Push to Talk over Cellular (PoC) capable mobile telephones may register with the wireless network when the telephones are in a predefined area (e.g., job site, etc.) When the mobile telephones leave the area, they may register with the network in their new location as being outside the predefined area. This registration, however, does not indicate the actual physical location of the mobile telephones outside the pre-defined area.

Figure 9:
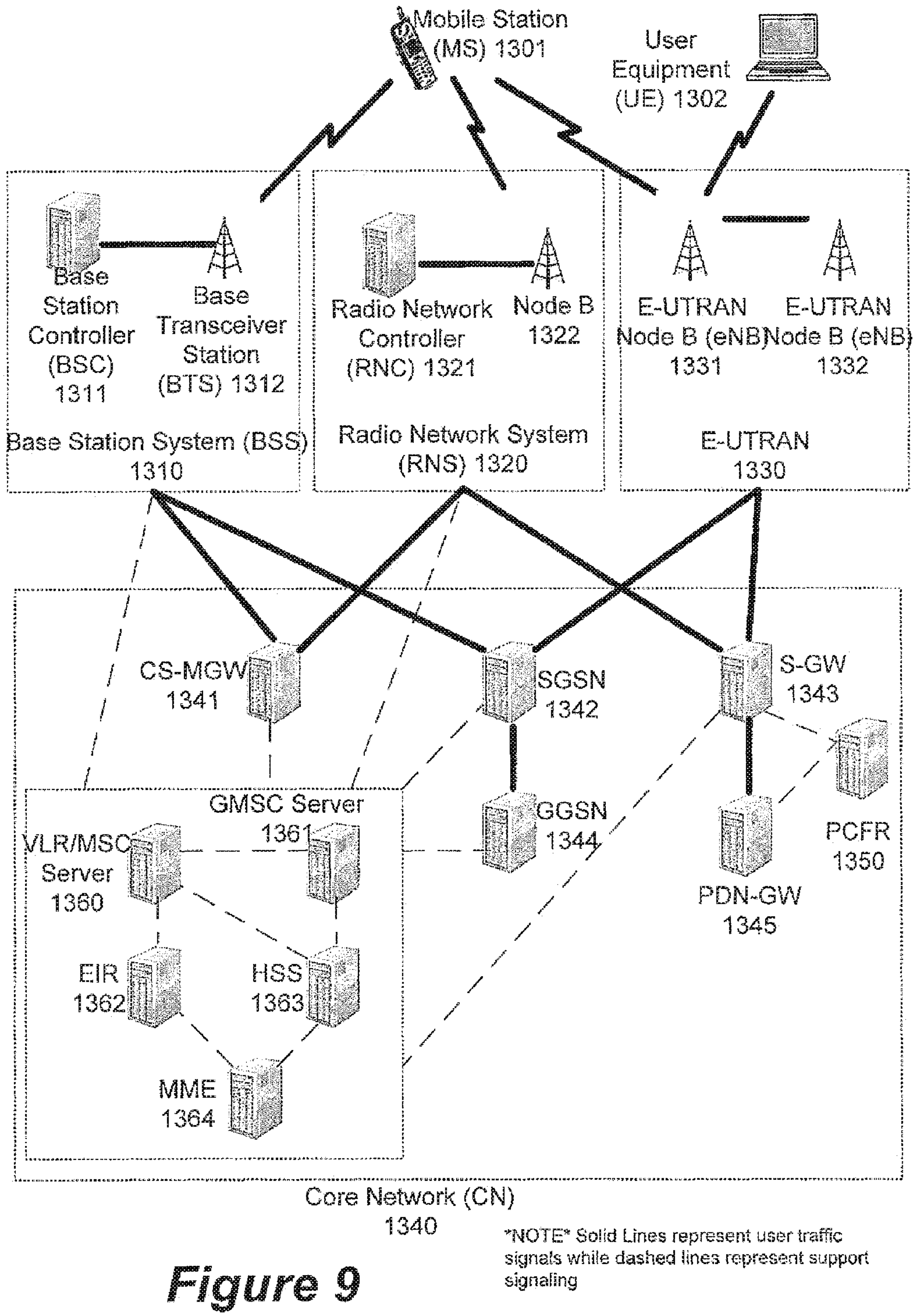
FIG. 9 illustrates a PLMN block diagram view of an exemplary architecture in which one or more disclosed embodiments of intelligent subscriber notification may be implemented.

FIG. 9 illustrates a PLMN block diagram view of an exemplary architecture in which one or more disclosed embodiments of intelligent subscriber notification may be implemented. Mobile Station (MS) 1301 is the physical equipment used by the PLMN subscriber. In one illustrative embodiment, communications device 40 may serve as Mobile Station 1301. Mobile Station 1301 may be one of, but not limited to, a cellular telephone, a cellular telephone in combination with another electronic device or any other wireless mobile communication device.

Mobile Station 1301 may communicate wirelessly with Base Station System (BSS) 1310. BSS 1310 contains a Base Station Controller (BSC) 1311 and a Base Transceiver Station (BTS) 1312. BSS 1310 may include a single BSC 1311/BTS 1312 pair (Base Station) or a system of BSC/BTS pairs which are part of a larger network. BSS 1310 is responsible for communicating with Mobile Station 1301 and may support one or more cells. BSS 1310 is responsible for handling cellular traffic and signaling between Mobile Station 1301 and Core Network 1340. Typically, BSS 1310 performs functions that include, but are not limited to, digital conversion of speech channels, allocation of channels to mobile devices, paging, and transmission/reception of cellular signals.

Additionally, Mobile Station 1301 may communicate wirelessly with Radio Network System (RNS) 1320. RNS 1320 contains a Radio Network Controller (RNC) 1321 and one or more Node(s) B 1322. RNS 1320 may support one or more cells. RNS 1320 may also include one or more RNC 1321/Node B 1322 pairs or alternatively a single RNC 1321 may manage multiple Nodes B 1322. RNS 1320 is responsible for communicating with Mobile Station 1301 in its geographically defined area. RNC 1321 is responsible for controlling the Node(s) B 1322 that are connected to it and is a control element in a UMTS radio access network. RNC 1321 performs functions such as, but not limited to, load control, packet scheduling, handover control, security functions, as well as controlling Mobile Station 1301's access to the Core Network (CN) 1340.

The evolved UMTS Terrestrial Radio Access Network (E-UTRAN) 1330 is a radio access network that provides wireless data communications for Mobile Station 1301 and User Equipment 1302. E-UTRAN 1330 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 1330 may include of series of logical network components such as E-UTRAN Node B (eNB) 1331 and E-UTRAN Node B (eNB) 1332. E-UTRAN 1330 may contain one or more eNBs. User Equipment 1302 may be any user device capable of connecting to E-UTRAN 1330 including, but not limited to, a personal computer, laptop, mobile device, wireless router, or other device capable of wireless connectivity to E-UTRAN 1330. The improved performance of the E-UTRAN 1330 relative to a typical UMTS network allows for increased bandwidth, spectral efficiency, and functionality including, but not limited to, voice, high-speed applications, large data transfer and IPTV, while still allowing for full mobility.

An exemplary embodiment of a mobile data and communication service that may be implemented in the PLMN architecture described in FIG. 9 is the Enhanced Data rates for GSM Evolution (EDGE). EDGE is an enhancement for GPRS networks that implements an improved signal modulation scheme known as 9-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 1301 may communicate with any or all of BSS 1310, RNS 1320, or E-UTRAN 1330. In a illustrative system, each of BSS 1310, RNS 1320, and E-UTRAN 1330 may provide Mobile Station 1301 with access to Core Network 1340. The Core Network 1340 may include of a series of devices that route data and communications between end users. Core Network 1340 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched-Media Gateway Function (CS-MGW) 1341 is part of Core Network 1340, and interacts with Visitor Location Register (VLR) and Mobile-Services Switching Center (MSC) Server 1360 and Gateway MSC Server 1361 in order to facilitate Core Network 1340 resource control in the CS domain. Functions of CS-MGW 1341 include, but are not limited to, media conversion, bearer control, payload processing and other mobile network processing such as handover or anchoring. CS-MGW 1340 may receive connections to Mobile Station 1301 through BSS 1310, RNS 1320 or both.

Serving GPRS Support Node (SGSN) 1342 stores subscriber data regarding Mobile Station 1301 in order to facilitate network functionality. SGSN 1342 may store subscription information such as, but not limited to, the International Mobile Subscriber Identity (IMSI), temporary identities, or Packet Data Protocol (PDP) addresses. SGSN 1342 may also store location information such as, but not limited to, the Gateway GPRS Support Node (GGSN) 1344 address for each GGSN where an active PDP exists. GGSN 1344 may implement a location register function to store subscriber data it receives from SGSN 1342 such as subscription or location information.

Serving Gateway (S-GW) 1343 is an interface which provides connectivity between E-UTRAN 1330 and Core Network 1340. Functions of S-GW 1343 include, but are not limited to, packet routing, packet forwarding, transport level packet processing, event reporting to Policy and Charging Rules Function (PCRF) 1350, and mobility anchoring for inter-network mobility. PCRF 1350 uses information gathered from S-GW 1343, as well as other sources, to make applicable policy and charging decisions related to data flows, network resources and other network administration functions. Packet Data Network Gateway (PDN-GW) 1345 may provide user-to-services connectivity functionality including, but not limited to, network-wide mobility anchoring, bearer session anchoring and control, and IP address allocation for PS domain connections.

Home Subscriber Server (HSS) 1363 is a database for user information, and stores subscription data regarding Mobile Station 1301 or User Equipment 1302 for handling calls or data sessions. Networks may contain one HSS 1363 or more if additional resources are required. Exemplary data stored by HSS 1363 include, but is not limited to, user identification, numbering and addressing information, security information, or location information. HSS 1363 may also provide call or session establishment procedures in both the PS and CS domains.

The VLR/MSC Server 1360 provides user location functionality. When Mobile Station 1301 enters a new network location, it begins a registration procedure. A MSC Server for that location transfers the location information to the VLR for the area. A VLR and MSC Server may be located in the same computing environment, as is shown by VLR/MSC Server 1360, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 1301 registration or procedures for handover of Mobile Station 1301 to a different section of the Core Network 1340. GMSC Server 1361 may serve as a connection to alternate GMSC Servers for other mobile stations in larger networks.

Equipment Identity Register (EIR) 1362 is a logical element which may store the International Mobile Equipment Identities (IMEI) for Mobile Station 1301. In a typical embodiment, user equipment may be classified as either "white listed" or "black listed" depending on its status in the network. In one embodiment, if Mobile Station 1301 is stolen and put to use by an unauthorized user, it may be registered as "black listed" in EIR 1362, preventing its use on the network. Mobility Management Entity (MME) 1364 is a control node which may track Mobile Station 1301 or User Equipment 1302 if the devices are idle. Additional functionality may include the ability of MME 1364 to contact an idle Mobile Station 1301 or User Equipment 1302 if retransmission of a previous session is required.

While example embodiments of systems and methods for intelligent subscriber notification have been described in connection with various communications devices and computing devices/processors, the underlying concepts can be applied to any communications or computing device, processor, or system capable of implementing the intelligent subscriber notification described. The various techniques described herein may be implemented in connection with hardware or a combination of hardware and software. Thus, the methods and apparatuses for intelligent subscriber notification, or certain aspects or portions thereof, can take the form of program code (i.e., instructions) embodied in tangible and/or a medium that is not a transient signal, such as floppy diskettes, CD-ROMs, hard drives, or any other machine-readable storage medium, wherein, when the program code is loaded into and executed by a machine, such as a computer, the machine becomes an apparatus for intelligent subscriber notification. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

Figure 10:
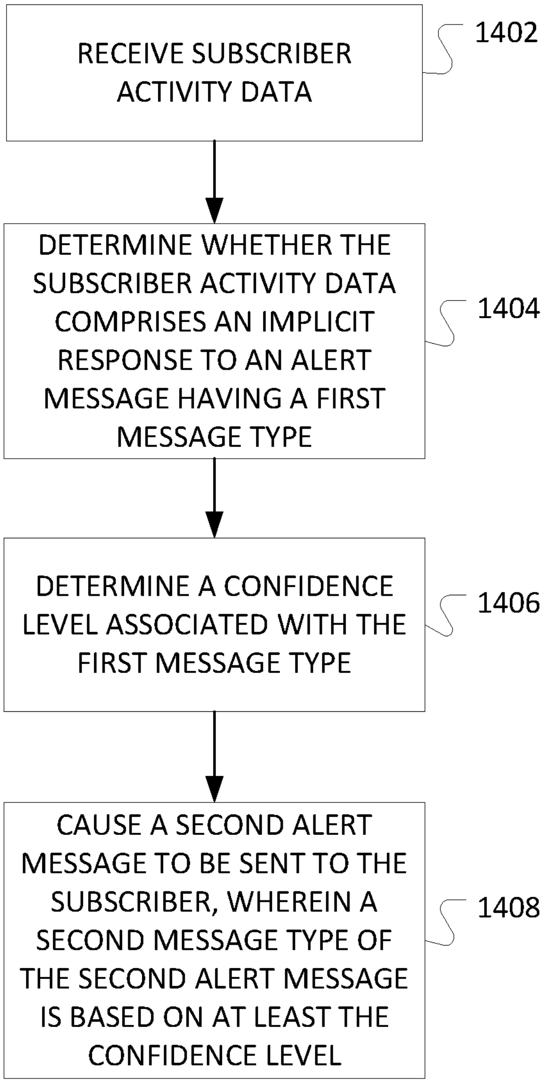
FIG. 10 illustrates a non-limiting exemplary method of implementing one or more disclosed embodiments of intelligent subscriber notification.

FIG. 10 illustrates a non-limiting exemplary method of implementing one or more disclosed embodiments of intelligent subscriber notification. At block 1402, an intelligent subscriber notification server may obtain information regarding subscriber activity. A subscriber may be associated with one or more network resources. The subscriber's association may be determined based on common billing information, user profile information, or other cross-linked information. A subscriber may be considered a person, business, government, organization, family entity, and the like, for example. At block 1404, the intelligent subscriber notification server may analyze real-time subscriber activity or historical subscriber activity data. In an embodiment, because of real-time analysis it may be discovered that a subscriber is currently using a particular service (e.g., voice on a mobile phone) and interrupt the voice call to deliver an alert. The same premise for real-time subscriber activity may apply to other network resources mentioned herein. Analysis may be done for all subscriber activity or a subset of subscriber activity such as activities just related to alerts. Analysis of implicit or explicit responses to receiving a particular type of alert message may be interpreted as an indication that a particular type of alert should or should not be received by a subscriber via a particular network resource. In an embodiment, an explicit alert response may be characterized as a selection of a button or another similar affirmative action by the subscriber) provided by an alert presentation interface that acknowledges the alert or indicates a preference for receiving alerts of the same or similar type. In an embodiment, an implicit alert response may be characterized as a non-affirmative response to a particular type of alert that may be interpreted as an indication that a particular type of alert should or should not be received by the subscriber. For example, an implicit alert response may be the act of not opening an e-mail or other message that comprises an alert. At block 1406, a notification profile may be created based on the analyzed subscriber activity data. The created notification profile may comprise information concerning the network resources that the subscriber is most likely to view, listen to, or otherwise interact with in a manner that the subscriber would timely recognize the existence of an alert. The time period may be set by a subscriber, network operator, or other party. In an embodiment, the notification profile may be created periodically (e.g., daily or monthly). The created notification profile may have a plurality of notification instructions for different scenarios. The created profile may provide alert confidence levels for each network resource for a particular time period, location, situation (e.g., weather), severity level, or the like. In an embodiment, an alert may be sent to network resources that cross a designated threshold alert confidence level. Alert confidence levels for a network resource may be indicative of how likely a subscriber may view an alert message. Crossing or meeting a threshold as discussed herein may be described as surpassing a number that is prescribed in order to determine when some action is triggered. For example, a threshold may be crossed if the number of keepalives from a device is below a certain amount (e.g., 3) within a timeframe (e.g., 10 minutes) and therefore an alert may be triggered. In another example, a threshold may be crossed if the number of errors is above a certain amount (e.g., 100) within a certain time frame (e.g., 1 minute) and therefore an alert may be triggered. The subscriber notification profile 310 may include identified network resources associated with the subscriber with corresponding confidence levels. The confidence levels may be indicative of an order in which alert messages may be sent to the subscriber. For example, if the confidence level is based on a 100 point scale, it may be determined that the closer the confidence level is to 100 the more likely a subscriber will view the alert message. In an embodiment, the alert message may be sent in order of highest confidence level to first service (e.g., e-mail). At block 1408, another alert message may be sent when a determine wait time is exceeded. The wait time period may be assigned by a network operator, subscriber, or otherwise determined based on previous activity of a subscriber with subscriber associated network resources. The wait time period for the acknowledgement and determined subsequent actions may be part of subscriber notification profile 310. If there is no acknowledgement within the determined period of time, then another alert message may be sent to another service (e.g., SMS) with the next highest confidence level at block 1408. Sending alert messages one at a time based on confidence level may minimize the bandwidth used to send an alert message to a subscriber."

Methods and systems for intelligent subscriber notification may also be practiced via communications embodied in the form of program code that is transmitted over some transmission medium, such as over electrical wiring or cabling, through fiber optics, or via any other form of transmission, wherein, when the program code is received, loaded into, and executed by a machine, such as an EPROM, a gate array, a programmable logic device (PLD), a client computer, or the like, the machine becomes an apparatus for intelligent subscriber notification. When implemented on a general-purpose processor, the program code combines with the processor to provide a unique apparatus that operates to invoke the functionality of intelligent subscriber notification as described herein. Additionally, any storage techniques used in connection with an intelligent subscriber notification system may invariably be a combination of hardware and software.

While intelligent subscriber notification have been described in connection with the various embodiments of the various figures, it is to be understood that other similar embodiments may be used or modifications and additions may be made to the described embodiments for performing the same function of intelligent subscriber notification without deviating therefrom. The intelligent subscriber notification described herein, although discussed in separate exemplary embodiments, may be modified to combine or delete features of the exemplary embodiments. For example, one skilled in the art will recognize intelligent subscriber notification as described in the present application may apply to any environment, whether wired or wireless, and may be applied to any number of such devices connected via a communications network and interacting across the network. Therefore, intelligent subscriber notification should not be limited to any single embodiment, but rather should be construed in breadth and scope in accordance with the appended claims.

What is claimed is:

1. A method comprising:

receiving, at a network-connected device, subscriber activity data;

determining whether the subscriber activity data comprises an implicit response by a subscriber to an alert message having a first message type;

determining a confidence level associated with the first message type, the confidence level indicative of an estimated likelihood that the subscriber will view messages of the first message type; and causing a second alert message to be sent to the subscriber, wherein a second message type of the second alert message is based on at least the confidence level, wherein the implicit response does not include a user input selecting the alert message or causing a responsive message to be sent.

2. The method of claim 1, wherein the confidence level is further based on a time of day the messages of the first message type are sent.

3. The method of claim 2, wherein the second message type is further based on a time of day the second alert message is sent.

4. The method of claim 1, wherein the first message type is the same as the second message type.

5. The method of claim 1, further comprising:

causing a third alert message based on the second alert message to be sent to the subscriber, the third alert message having the first message type, wherein the first message type is different than the second message type.

6. The method of claim 5, wherein causing the third alert message to be sent is based the second alert message having a severity level.

7. The method of claim 1, wherein the first message type comprises least one of an e-mail, a voicemail, a short message service message, a multimedia messaging service message, a wireline voice, a wireless voice, or a social media application communication.

8. A non-transitory computer-readable storage medium storing instructions that cause a processor executing the instructions to effectuate operations, the operations comprising:

receiving subscriber activity data;

determining whether the subscriber activity data comprises an implicit response by a subscriber to an alert message having a first message type;

determining a confidence level associated with the first message type, the confidence level indicative of an estimated likelihood that the subscriber will view messages of the first message type; and causing a second alert message to be sent to the subscriber, wherein a second message type of the second alert message is based on at least the confidence level, wherein the implicit response does not include a user input selecting the alert message or causing a responsive message to be sent.

9. The non-transitory computer-readable storage medium of claim 8, wherein the confidence level is further based on a time of day the messages of the first message type are sent.

10. The non-transitory computer-readable storage medium of claim 8, wherein the implicit response includes an interaction between the subscriber and a network resource associated with the alert message.

11. The non-transitory computer-readable storage medium of claim 8, wherein the implicit response includes a move of the subscriber to a location associated with the alert message.

12. The non-transitory computer-readable storage medium of claim 8, wherein the first message type is the same as the second message type.

13. The non-transitory computer-readable storage medium of claim 8, the operations further comprising:

causing a third alert message based on the second alert message to be sent to the subscriber, the third alert message having the first message type, wherein the first message type is different than the second message type.

14. The non-transitory computer-readable storage medium of claim 13, wherein causing the third alert message to be sent is based on a severity level of the second alert message.

15. A system, comprising:

a processor; and memory storing instructions that cause the processor to effectuate operations, the operations comprising:

receiving subscriber activity data;

determining whether the subscriber activity data comprises an implicit response by a subscriber to an alert message having a first message type;

determining a confidence level associated with the first message type, the confidence level indicative of an estimated likelihood that the subscriber will view messages of the first message type; and causing a second alert message to be sent to the subscriber, wherein a second message type of the second alert message is based on at least the confidence level, wherein the implicit response does not include a user input selecting the alert message or causing a responsive message to be sent.

16. The system of claim 15, wherein the confidence level is further based on a time of day the messages of the first message type are sent.

17. The system of claim 15, wherein the implicit response includes an interaction between the subscriber and a network resource associated with the alert message.

18. The system of claim 15, wherein the first message type is the same as the second message type.

19. The system of claim 15, wherein the implicit includes a move of the subscriber to a location associated with the alert message.

20. The system of claim 15, the operations further comprising:

causing a third alert message based on of the second alert message to be sent to the subscriber, the third alert message having the first message type, wherein the first message type is different than the second message type.

* * * * *